United States Patent Office 2,886,603
Patented May 12, 1959

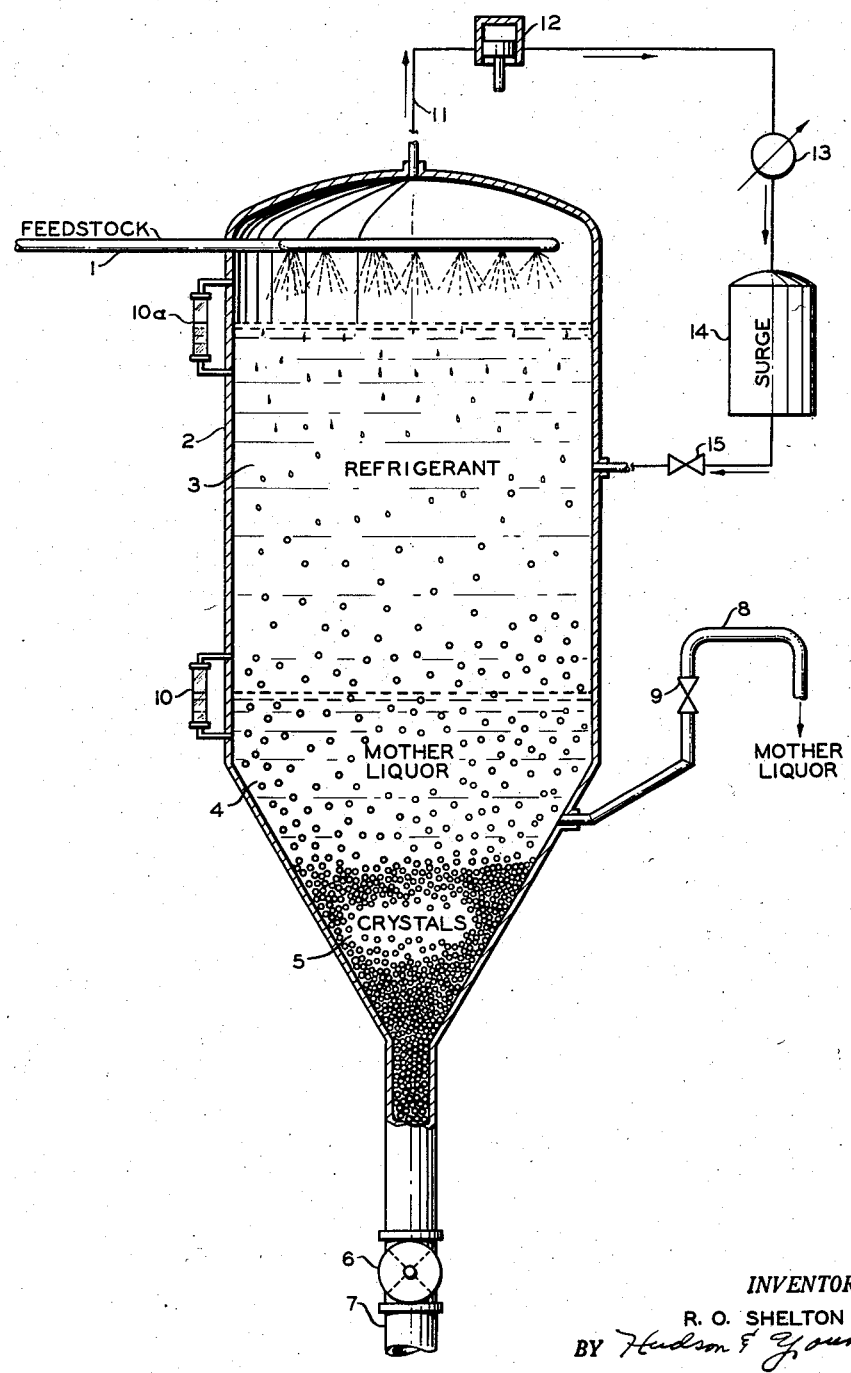

2,886,603

CRYSTALLIZATION PROCESS

Russell O. Shelton, Bartlesville, Okla., assignor to Phillips Petroleum Company, a corporation of Delaware Application November 22, 1954, Serial No. 470,327

17 Claims. (Cl. 260—645)

This invention is a process and apparatus for producing crystals in a liquid mixture. A preferred form of the invention is a process for crystallizing the high melting component from a hydrocarbon mixture by direct contact with a refrigerant insoluble therewith, thereby producing crystals adapted for final purification in conventional crystal purification means.

Separation of compounds may be effected by distillation, solvent extraction, and crystallization. The latter method is normally used on mixtures which are difficult to separate by the other two methods. This method has special value where boiling points are close together. Furthermore, fractional distillation and solvent extraction involve a large number of separation stages or steps to obtain products of high purity, whereas in many cases the crystallization process produces materials of high purity in a single stage.

There are two conventional methods of refrigerating a mixture to effect crystallization therein. One of these requires that the mixture be passed through a conduit cooled by indirect heat exchange with a refrigerant. The high melting component crystallizes out on the walls of the conduit and is continuously scraped off; see, for example, British Patent 673,220. The other method consists of direct evaporation of refrigerant from a mixture of the refrigerant and the solution to be crystallized. This, of course, requires that the refrigerant be miscible with the solution. The present invention is in a process for crystallization which is unlike either of the aforesaid types and has advantages over both.

The principal object of the present invention is to provide a method for the formation of crystals in liquid mixtures. A further object is to provide a crystallization process wherein the refrigerant is in direct contact with the feed mixture but is immiscible therewith. A further object is to provide a crystallization system employing fewer moving parts than conventional crystallization systems.

In the present invention the feedstock, for example, an organic liquid mixture, is sprayed into a body of liquid refrigerant which is immiscible therewith and of lower density, whereby spheroidal droplets of the mixture are formed in the refrigerant and settle therethrough. The formation of spheroids, of course, is caused by the surface tension forces at the feedstock-refrigerant interface. In settling through the refrigerant the high melting component of the mixture freezes, forming crystals. These and the low melting portion of the liquid stratify beneath the body of refrigerant, the crystals descending through the refrigerant and underlying mother liquor to the base of the crystallizing zone. The crystals and any excess mother liquor are drawn off separately at the rate required to maintain a substantially uniform level of mother liquor in the crystallizer. As in any crystal formation process, the crystals, while themselves theoretically pure, are contaminated with adsorbed or occluded mother liquor, and these can be further purified, by any known means for the removal of such mother liquor, to produce the crystallized component as a final product in the degree of purity desired.

In certain instances, as when the feed to the crystallizer is relatively rich in the component to be crystallized out, it will be found that all the mother liquor is adsorbed or occluded, so that no separate liquid phase of mother liquor remains. In such cases no separate withdrawal of mother liquor is required and the crystals are withdrawn from the crystallizer together with a portion of the liquid refrigerant.

The crystallization process of this invention is applicable to a great number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. Specific examples of organic systems to which this invention is applicable are disclosed in U.S. 2,683,178. Of particular importance is the fractionation of systems containing xylenes, systems containing cyclohexane, systems containing normal paraffins, systems containing benzene, and the like. It has been found e.g. that para-xylene can be crystallized from a multi-component mixture comprising isomeric alkyl benzenes, that benzene can be crystallized from paraffinic hydrocarbon-benzene mixture or from a benzene-toluene-aniline mixture, and that cyclohexane can be crystallized from a mixture comprising a paraffinic hydrocarbon and cyclohexane. The invention is also applicable to the separation of individual components from a system of cymenes, a system of nitro toluenes, a system of methyl-substituted alkanes, etc.

A clearer understanding of the invention may be had from a study of the accompanying drawing which diagrammatically illustrates the crystallizer and associated system.

A stream of hydrocarbon feed stock introduced through line 1 is continuously sprayed into the upper portion of crystallizer 2 where it descends as droplets through a column of refrigerant 3. The uncrystallized portion of the liquid forms an intermediate underlying layer 4. The crystals formed within the refrigerant, being heavier than the mother liquor, settle through the intermediate layer to the bottom of the crystallizer, accumulating there as a crystalline column 5. Crystals are withdrawn from this column by means of a star valve 6 and passed through conduit 7 to suitable crystal purification means, such as described in Serial No. 422,580, filed April 12, 1954, now abandoned, same assignee. In place of a star valve, other suitable valve means can be used such as an iris-type diaphragm valve, a reciprocating piston, or the like. Mother liquor is rejected through a side arm 8 at a rate controlled through the valve 9. This, of course, governs the position of the refrigerant-mother liquor interface. The mother liquor layer should be deep enough so that it can be withdrawn without disturbing the descending crystals. The refrigerant layer 3 should be deep enough to provide the necessary heat removal to crystallize the one component. Refrigerant vapors withdrawn overhead through line 11 are compressed and condensed in compressor 12 and condenser 13, respectively, and the liquid collected in surge tank 14. From this point it is injected through valve 15 into the crystallizer 2 at a sufficient rate to replenish what boils away. Both liquid levels can be observed visually through gage glasses 10, 10a and respective valves 9, and 15, adjusted manually according to desired changes in level. Of course, gage 10 could be replaced by an interface level controller operating valve 9, and gage 10a could be replaced by a liquid level controller operating valve 15.

This process has several advantages over the prior art methods of fractional crystallization. The unit just described has fewer moving parts than the scraped surface chiller; hence there is less chance for failure of parts through wear and hence less need for repairs with accompanying shut-downs. For example, the scraper blades in scraped surface chillers sometimes bend out of shape or break; the torque causing this is absent in the present system.

*Example 1*

A liquid feed stream comprising (by weight) 25 percent para-xylene, 30 percent meta-xylene, 17 percent ortho-xylene and 28 percent non-xylenes (chiefly ethyl benzene and toluene with small amounts of paraffinic hydrocarbons) is supplied to the crystallizer illustrated in the drawing. A body of liquid ammonia is maintained in the crystallizer at a pressure equivalent to 20 inches mercury vacuum, the resulting evaporation of the ammonia producing a temperature of about −62° F. Para-xylene crystals are withdrawn from the bottom of the crystallizer at a rate of 12.3 lb. per 100 lb. of feed. Mother liquor containing 14.5 percent para-xylene is withdrawn from a zone just above the crystal mass. The crystals are passed to a separate purification means for the removal of adsorbed or occluded impurities and the recovery of para-xylene of high purity.

*Example 2*

A liquid feed stream comprising 75 percent by weight para-xylene, 21.8 percent meta-xylene and the remainder chiefly ortho-xylene, is fed into the crystallizer illustrated in the drawing. A body of liquid ammonia is maintained in the crystallizer as in Example 1, the temperature again being maintained about −62° F. Para-xylene crystals are withdrawn from the bottom of the crystallizer at a rate of 71.4 lbs. per 100 pounds of feed. In this example the mother liquor is entirely occluded and/or adsorbed on the crystals, so that no separate liquid phase of mother liquor is maintained in the crystallizer. The crystals are passed to a separate purification means for the removal of adsorbed or occluded impurities and the recovery of para-xylene in high purity.

It should be understood that the presence or absence of a separate mother liquor phase within the crystallizer depends on the ratio of crystals to mother liquor. The crystal layer withdrawn at the base of the vessel is a slurry, the liquid phase being either mother liquor or the liquid refrigerant. Before a separate mother liquor layer can form, the amount of mother liquor produced in the crystallization process must exceed that adsorbed by the crystals.

In any specific case the presence or absence of a separate mother liquor liquid phase will depend not only upon the composition of the feed stream but also upon the temperature to which it is cooled, i. e. the temperature at which the crystallizer is operated. In general, it is preferred to operate the crystallizer at a temperature between the initial freezing point of the mixture as an upper limit, and the highest eutectic-forming temperature of the system as a lower limit. By the "initial freezing point of the mixture" is meant the temperature at which crystals first begin to form as the temperature of the liquid mixture is lowered. A feed which is rich in the crystallizable component will, in general, produce a higher ratio of crystals to mother liquor before the eutectic temperature is reached than will a relatively lean feed.

The principal requirement of the refrigerant is that it be immiscible with the mixture to be fractionated and also of lower density than said mixture. Of course, it should be inert with respect to the mother liquor and the crystals and must be capable of attaining the required temperature of operation. Refrigerants which meet these conditions are ammonia and the two silicon hydrides, $SiH_4$ and $Si_2H_6$. While the latter are suitable from the standpoint of density (about 0.68) they are reactive toward oxygen and water; hence, air must be carefully excluded and the feed dried to a very low water content before these refrigerants can be used. The refrigerant could, of course, be a mixture of ammonia and either or both of the silicon hydrides. However, ammonia alone is preferred.

The foregoing description of the invention is to be considered as illustrative, not limiting, since certain variations may be made within the scope of the following claims without departing from the spirit of the invention.

I claim:

1. A process for producing crystals from a feed consisting essentially of a multi-component liquid mixture which comprises introducing said feed into the upper portion of a crystallization zone; maintaining in said zone a body of liquid refrigerant immiscible with said mixture and of lower specific gravity; maintaining the temperature of said body of refrigerant below the initial freezing point of said mixture; allowing said mixture to gravitate in subdivided form downwardly through said body of refrigerant, thereby causing crystals of one component of said mixture to form; and removing said crystals from said zone as the product of the process.

2. A process for the production of crystals from a feed consisting essentially of a multi-component liquid mixture comprising dispersing said feed in a column of liquid refrigerant which is immiscible with said mixture and of lower specific gravity; permitting the dispersed mixture to settle solely under the influence of gravity through said refrigerant; continuously vaporizing refrigerant and withdrawing the vapors overhead, the resultant cooling causing crystallization of one component of the mixture; withdrawing the resulting crystals below the base of the refrigerant column as the product of the process, any mother liquor formed during crystallization being occluded, at least in part, on said withdrawn crystals; and condensing the refrigerant vapors for recycle to the refrigerant column.

3. Process of claim 2 wherein said multi-component liquid comprises a mixture of xylene isomers.

4. Process of claim 3 wherein the refrigerant is selected from the group consisting of ammonia and silicon hydride.

5. In a process for separating para-xylene from a feed consisting essentially of a liquid mixture of xylene isomers wherein said mixture is cooled to a temperature below the initial freezing point of para-xylene but not below the highest eutectic point of the mixture, whereby para-xylene crystallizes out and is recovered for further purification, the improvement comprising effecting said crystallization by introducing said feed into the top of a column of liquid refrigerant, said refrigerant being immiscible with the xylenes and of lesser density, whereby said mixture settles solely under the influence of gravity through the liquid refrigerant in the form of spheroids; adjusting the temperature of the refrigerant by evaporative cooling thereof to effect formation of para-xylene crystals, collecting the latter beneath said refrigerant column, withdrawing the collected crystals as the product of the process along with occluded mother liquor and refrigerant, any mother liquor in excess of that so withdrawn forming an intermediate layer immediately underlying the refrigerant column and covering the accumulated crystals; and maintaining the level of said intermediate layer substantially constant by withdrawing said mother liquor therefrom at a point separate from that at which the crystals are withdrawn.

6. Process of claim 5 wherein the vapors from the evaporative cooling of the refrigerant column are condensed and returned thereto to maintain said column at a substantially constant level.

7. A process for producing crystals from a feed consisting essentially of a liquid hydrocarbon mixture which comprises introducing said feed into the upper portion of a vertical crystallization zone; maintaining a column of liquid refrigerant in said zone, said refrigerant being of lower specific gravity than said hydrocarbon mixture and immiscible therewith, whereby the hydrocarbon mixture settles solely under the influence of gravity through said column in the form of dispersed droplets; continuously adding refrigerant to said column and vaporizing refrigerant therefrom, whereby the temperature of said column is maintained sufficiently low to effect selective crystallization of one component of said hydrocarbon mixture; collecting the remainder of said mixture as a layer of mother liquor underlying the refrigerant column; collecting the crystals as a solid mass within said mother liquor; any liquor in excess of that occluded by the crystal mass forming an intermediate layer overlying said mass and underlying the refrigerant column; withdrawing crystals from the base of said mass as the product of the process, along with occluded mother liquor, and withdrawing mother liquor as a side stream from said intermediate layer, the amount of crystals, mother liquor, and refrigerant withdrawn being sufficient to maintain the levels thereof substantially constant.

8. Process of claim 5 wherein the refrigerant is selected from the group consisting of ammonia and silicon hydride.

9. Process of claim 2 wherein the refrigerant is ammonia.

10. Process of claim 2 wherein the refrigerant is silicon hydride.

11. Process of claim 2 wherein said multi-component liquid comprises a mixture of isomeric alkyl benzenes and para-xylene and wherein said crystal product comprises para-xylene.

12. Process of claim 2 wherein said multi-component liquid comprises a mixture of paraffinic hydrocarbons and benzene and wherein said crystal product comprises benzene.

13. Process of claim 2 wherein said multi-component liquid comprises a mixture of benzene, toluene and aniline and wherein said crystal product comprises benzene.

14. Process of claim 2 wherein said multi-component liquid comprises a mixture of paraffinic hydrocarbons and cyclohexane and wherein said crystal product comprises cyclohexane.

15. Process of claim 2 wherein said multi-component liquid comprises a mixture of cymenes.

16. Process of claim 2 wherein said multi-component liquid comprises a mixture of nitro toluenes.

17. Process of claim 2 wherein said multi-component liquid comprises a mixture of methyl-substituted alkanes.

References Cited in the file of this patent

UNITED STATES PATENTS

| | | |
|---|---|---|
| 2,540,977 | Arnold | Feb. 6, 1951 |
| 2,666,304 | Ahrel | Jan. 19, 1954 |
| 2,683,178 | Findlay | July 6, 1954 |

FOREIGN PATENTS

| | | |
|---|---|---|
| 178,013 | Germany | June 30, 1935 |